US010466655B1

(12) United States Patent
Matsumoto

(10) Patent No.: US 10,466,655 B1
(45) Date of Patent: Nov. 5, 2019

(54) ELECTRONIC TIMEPIECE AND CONTROL METHOD OF ELECTRONIC TIMEPIECE

(71) Applicant: SEIKO EPSON CORPORATION, Tokyo (JP)

(72) Inventor: Kazumi Matsumoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/233,771

(22) Filed: Dec. 27, 2018

(51) Int. Cl.
*H04B 17/00* (2015.01)
*G04C 9/00* (2006.01)
*H04B 1/16* (2006.01)
*G04R 20/22* (2013.01)
*G04R 40/04* (2013.01)

(52) U.S. Cl.
CPC ............. *G04R 20/22* (2013.01); *G04R 40/04* (2013.01)

(58) Field of Classification Search
CPC . H04B 1/16; H04B 17/00; G04C 9/00; G04C 9/02
See application file for complete search history.

(56) References Cited

U.S. PATENT DOCUMENTS 4,315,332 A * 2/1982 Sakami .................... H04B 1/16 368/47
4,582,434 A * 4/1986 Plangger ................ G04R 20/16 368/46
4,768,178 A * 8/1988 Conklin ................. G04R 20/10 368/47
5,537,101 A * 7/1996 Nakajima .............. G04G 13/02 340/7.1
6,473,030 B1 10/2002 McBurney et al.
7,372,779 B2 * 5/2008 Takada ................. G04G 9/0076 368/21
7,719,928 B2 * 5/2010 Meltzer .................. G04R 20/10 368/47
7,760,588 B2 * 7/2010 Takada ................... G04R 20/10 368/46
8,218,691 B2 * 7/2012 Nomura ................. G04R 20/10 368/47
9,709,961 B2 7/2017 Fujisawa
2005/0048941 A1 3/2005 McBurney
2005/0094495 A1 * 5/2005 Takada ................. G04G 9/0076 368/47
2007/0026832 A1 * 2/2007 Someya ................. G04R 20/10 455/263
2010/0177854 A1 * 7/2010 Nomura ................. G04R 20/10 375/340

(Continued)

FOREIGN PATENT DOCUMENTS

JP H03-0574436 B 12/2002
JP 3574436 B2 10/2004

(Continued)

*Primary Examiner* — Blane J Jackson
(74) *Attorney, Agent, or Firm* — Oliff PLC

(57) ABSTRACT

A processor controls an oscillation circuit such that a frequency of a clock signal is close to a reference frequency based on a frequency of a carrier wave of a standard radio wave and the frequency of the clock signal. In this manner, since the processor controls the frequency of the clock signal by using the carrier wave of the standard radio wave of which the frequency is managed with high accuracy, it becomes possible to improve accuracy of an internal time.

17 Claims, 8 Drawing Sheets

(56) References Cited

U.S. PATENT DOCUMENTS

| | | | | |
|---|---|---|---|---|
| 2012/0008466 A1* | 1/2012 | Tokiwa | G04R 20/10 | 368/47 |
| 2013/0016589 A1* | 1/2013 | Takada | G04F 5/14 | 368/47 |
| 2014/0254328 A1* | 9/2014 | Tamura | H03H 9/21 | 368/47 |
| 2014/0269220 A1* | 9/2014 | Tamura | H03H 9/21 | 368/47 |

FOREIGN PATENT DOCUMENTS

| | | | |
|---|---|---|---|
| JP | 4931629 B2 * | 5/2012 | G04C 9/02 |
| JP | 2016-161467 A | 9/2016 | |

* cited by examiner

ELECTRONIC TIMEPIECE AND CONTROL METHOD OF ELECTRONIC TIMEPIECE

This application claims priority to Japanese Patent Application No. 2017-250310, filed Dec. 27, 2017. The disclosure of the prior application is hereby incorporated in its entirety herein.

BACKGROUND

1. Technical Field

The present invention relates to an electronic timepiece and a control method of an electronic timepiece.

2. Related Art

In the related art, as a technique for adjusting an internal time of an electronic timepiece to an accurate time, a configuration that receives a standard radio wave is known. For example, JP-A-2016-161467 discloses an electronic timepiece that receives the standard radio wave. The electronic timepiece demodulates the received standard radio wave to acquire a time code out (TCO) signal, extracts date information and time information from the TCO signal to correct the internal time to be adjusted to an accurate time.

A radio wave correction timepiece of JP-A-2016-161467 includes: a receiver that receives a standard radio wave; a crystal oscillator 431 that generates a reference signal; a time counter 471 that measures an internal time based on the reference signal; a fixed time reception processor 472 that operates the receiver and executes reception processing; and a time correction unit 474 that corrects the internal time. The fixed time reception processor 472 executes the reception processing at a first time to acquire first reception time data, compares the acquired first reception time data with the internal time, and in a case where a time difference is equal to or greater than a first threshold value, executes the reception processing at a second time different from the first time to acquire second reception time data. However, even when the internal time is corrected by using the TCO signal acquired from the standard radio wave, in a case where the frequency accuracy of the clock signal of the crystal oscillator 431 is low, there is a problem that an error in time due to the clock signal is accumulated in the internal time.

SUMMARY

An advantage of some aspects of the invention is to improve accuracy of an internal time of an electronic timepiece.

An electronic timepiece according to a preferred aspect (first aspect) of the invention includes: a receiver that receives a standard radio wave; an oscillation circuit that generates a clock signal used for measuring an internal time; and a processor that controls the oscillation circuit such that a frequency of the clock signal is close to a reference frequency determined in accordance with the frequency of the carrier wave of the standard radio wave based on a frequency of a carrier wave of the standard radio wave received by the receiver and the frequency of the clock signal.

According to the aspect, since the frequency of the clock signal is controlled by using the carrier wave of the standard radio wave of which the frequency is managed with high accuracy, it is possible to improve the accuracy of the internal time.

In a preferred example (second aspect) of the first aspect, the processor includes a specifying unit that specifies a difference between the reference frequency and the frequency of the clock signal, and a correction unit that controls the oscillation circuit based on the difference and corrects the frequency of the clock signal so as to be close to the reference frequency.

According to the aspect, by controlling the oscillation circuit such that the specified difference is canceled, it becomes possible to make the frequency of the clock signal close to the reference frequency.

In a preferred example (third aspect) of the second aspect, the specifying unit specifies the difference based on a reference wave generated from the carrier wave of the standard radio wave and the clock signal.

According to the aspect, it becomes possible to obtain a highly accurate reference wave by generating the reference wave from the carrier wave of the highly accurate standard radio wave.

In a preferred example (fourth aspect) of the third aspect, the specifying unit specifies the difference based on a first phase difference between the reference wave and the clock signal at a first time, a second phase difference between the reference wave and the clock signal at a second time, and a time period from the first time to the second time.

In general, as a method of obtaining a difference between two frequencies, there is a so-called counter method of counting the number of cycles of the other frequency within a time period obtained by multiplying one cycle of one frequency that serves as a reference by an integer and specifying the other frequency, and specifying the difference between one frequency and the other frequency. Therefore, in the counter system, in order to obtain information necessary for specifying the other frequency, it takes time that is an integral multiple of one cycle. Meanwhile, according to the aspect, it becomes possible to obtain the first phase difference and the second phase difference used for specifying the difference in the time period from the first time to the second time. By setting the time from the first time to the second time to the time until one cycle of the reference frequency elapses, it is possible to specify the difference in a shorter period of time compared to the counter method.

In a preferred example (fifth aspect) of the second to fourth aspects, the correction unit outputs a control voltage based on the difference, and the oscillation circuit oscillates a clock signal having a frequency that corresponds to the control voltage.

According to the aspect, the control voltage based on the difference is input to the oscillation circuit, it is possible to correct the frequency of the clock signal, and it becomes possible to improve the accuracy of the internal time.

In a preferred example (sixth aspect) of the second to fifth aspects, the oscillation circuit oscillates a clock signal having a frequency that corresponds to the control voltage, and includes a storage that stores cumulative operation time characteristic information related to a cumulative operation time of the oscillation circuit and a frequency of a clock signal generated in a case where a predetermined control voltage is input to the oscillation circuit, the processor includes a control voltage generation unit that specifies an error in frequency of the clock signal that corresponds to the cumulative operation time of the oscillation circuit with reference to the cumulative operation time characteristic information, and generates the control voltage such that the error is canceled, and the correction unit updates the cumulative operation time characteristic information based on the difference and the cumulative operation time of the oscillation circuit at a point of time when the difference is specified, and corrects the frequency of the clock signal.

According to the aspect, when a certain period of time has elapsed after the difference was specified, even in a case where the standard radio wave is not received, it becomes possible to correct the frequency of the clock signal by using the updated cumulative operation characteristic information.

In a preferred example (seventh aspect) of the second to fourth aspects, the oscillation circuit oscillates a clock signal having a frequency that corresponds to the control voltage, and includes a storage that stores temperature characteristic information related to a frequency of the clock signal generated in a case where a temperature obtained by the oscillation circuit and a predetermined voltage are input to the oscillation circuit, the processor includes a control voltage generation unit that specifies an error in frequency of the clock signal that corresponds to the temperature of the oscillation circuit with reference to the temperature characteristic information, and generates the control voltage such that the error is canceled, and the correction unit updates the temperature characteristic information based on the difference and the temperature of the oscillation circuit at a point of time when the difference is specified, and corrects the frequency of the clock signal.

According to the aspect, even in a case where the standard radio wave is not received at a temperature different from the temperature when the difference is specified, it becomes possible to correct the frequency of the clock signal by using the updated temperature characteristic information.

In a preferred example (eighth aspect) of the second to the seventh aspects, an internal time correction unit that corrects the internal time based on the difference and the number of clock signals from the time when the internal time is set based on the standard radio wave to the current time, is further provided.

According to the aspect, it becomes possible to reduce the load on the correction of the internal time compared to a case where the internal time is corrected by always using a TCO signal in a case where the standard radio wave is received. In order to obtain the TCO signal, it is necessary to demodulate the standard radio wave, but in a case where the internal time is corrected by using the carrier wave of the standard radio wave, the standard radio wave may not be demodulated. Therefore, by correcting the internal time by using the difference between the reference frequency and the frequency of the clock signal, compared to a case where the internal time is corrected by always using the TCO signal in a case where the standard radio wave is received, it becomes possible to reduce the load on the correction of the internal time, and to complete the correction in a short period of time.

A control method of an electronic timepiece according to a preferred aspect (ninth aspect) of the invention, is a control method of an electronic timepiece including a receiver that receives a standard radio wave, and an oscillation circuit that generates a clock signal used for measuring an internal time, the method including causing the electronic timepiece to control the oscillation circuit such that the frequency of the clock signal is close to a reference frequency determined in accordance with a frequency of a carrier wave of the standard radio wave based on the frequency of the carrier wave of the standard radio wave received by the receiver and the frequency of the clock signal.

According to the aspect, since the frequency of the clock signal is controlled by using the carrier wave of the standard radio wave of which the frequency is managed with high accuracy, it is possible to improve the accuracy of the internal time.

In a preferred example (tenth aspect) of the ninth aspect, the electronic timepiece specifies a difference between the reference frequency and the frequency of the clock signal, and controls the oscillation circuit and corrects the frequency of the clock signal so as to be close to the reference frequency, based on the difference.

According to the aspect, by controlling the oscillation circuit such that the specified difference is canceled, it becomes possible to make the frequency of the clock signal close to the reference frequency.

In a preferred example (eleventh aspect) of the tenth aspect, the electronic timepiece specifies the difference based on a reference wave generated from the carrier wave of the standard radio wave and the clock signal.

According to the aspect, it becomes possible to obtain a highly accurate reference wave by generating the reference wave from the carrier wave of the highly accurate standard radio wave.

In a preferred example (twelfth aspect) of the eleventh aspect, the electronic timepiece specifies the difference based on a first phase difference between the reference wave and the clock signal at a first time, a second phase difference between the reference wave and the clock signal at a second time, and a time period from the first time to the second time.

According to the aspect, it becomes possible to obtain the first phase difference and the second phase difference used for specifying the difference in the time period from the first time to the second time. By setting the time period from the first time to the second time to the time period until one cycle of the reference frequency elapses, it is possible to specify the difference in a shorter period of time compared to the counter method.

In a preferred example (thirteenth aspect) of the tenth to twelfth aspects, the electronic timepiece outputs a control voltage based on the difference, and the oscillation circuit oscillates a clock signal having a frequency that corresponds to the control voltage.

According to the aspect, the control voltage based on the difference is input to the oscillation circuit, it is possible to correct the frequency of the clock signal, and it becomes possible to improve the accuracy of the internal time.

In a preferred example (fourteenth aspect) of the tenth to twelfth aspects, the oscillation circuit oscillates a clock signal having a frequency that corresponds to the control voltage, the electronic timepiece includes a storage that stores cumulative operation time characteristic information related to a cumulative operation time of the oscillation circuit and a frequency of a clock signal generated in a case where a predetermined control voltage is input to the oscillation circuit, and the electronic timepiece specifies an error in frequency of the clock signal that corresponds to the cumulative operation time of the oscillation circuit with reference to the cumulative operation time characteristic information, generates the control voltage such that the error is canceled, updates the cumulative operation time characteristic information based on the difference and the cumulative operation time of the oscillation circuit at a point of time when the difference is specified, and corrects the frequency of the clock signal.

According to the aspect, when a certain period of time has elapsed after the difference was specified, even in a case where the standard radio wave is not received, it is possible to correct the frequency of the clock signal by using the updated cumulative operation characteristic information.

In a preferred example (fifteenth aspect) of the tenth to twelfth aspects, the oscillation circuit oscillates a clock signal having a frequency that corresponds to the control voltage, the electronic timepiece includes a storage that stores temperature characteristic information related to a frequency of the clock signal generated in a case where a temperature obtained by the oscillation circuit and a predetermined voltage are input to the oscillation circuit, and the electronic timepiece specifies an error in frequency of the clock signal that corresponds to the temperature of the oscillation circuit with reference to the temperature characteristic information, generates the control voltage such that the error is canceled, updates the temperature characteristic information based on the difference and the temperature of the oscillation circuit at a point of time when the difference is specified, and corrects the frequency of the clock signal.

According to the aspect, even in a case where the standard radio wave is not received at a temperature different from the temperature at the time of specifying the difference, it becomes possible to correct the frequency of the clock signal by using the updated temperature characteristic information.

In a preferred example (sixteenth aspect) of the tenth to the fifteenth aspects, the electronic timepiece corrects the internal time based on the difference and the number of clock signals from the time when the internal time is set based on the standard radio wave to the current time.

According to the aspect, it becomes possible to reduce the load on the correction of the internal time compared to a case where the internal time is corrected by always using a TCO signal in a case where the standard radio wave is received. In order to obtain the TCO signal, it is necessary to demodulate the standard radio wave, but in a case where the internal time is corrected by using the carrier wave of the standard radio wave, the standard radio wave may not be demodulated. Therefore, by correcting the internal time by using the difference between the reference frequency and the frequency of the clock signal, compared to a case where the internal time is corrected by always using the TCO signal in a case where the standard radio wave is received, it becomes possible to reduce the load on the correction of the internal time, and to complete the correction in a short period of time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, aspects for carrying out the invention will be described with reference to the drawings. However, in each drawing, the dimensions and scales of each part are appropriately different from the actual dimensions and scales. In addition, since the embodiments described below are appropriate specific examples of the invention, various technically preferable limitations are given, but the scope of the invention is not limited to the aspects as long as it is not described that the invention is particularly limited in the following description.

A. First Embodiment

Hereinafter, an electronic timepiece 1 according to a first embodiment will be described.

A.1. Outline of Electronic Timepiece 1 According to First Embodiment

Figure 1:
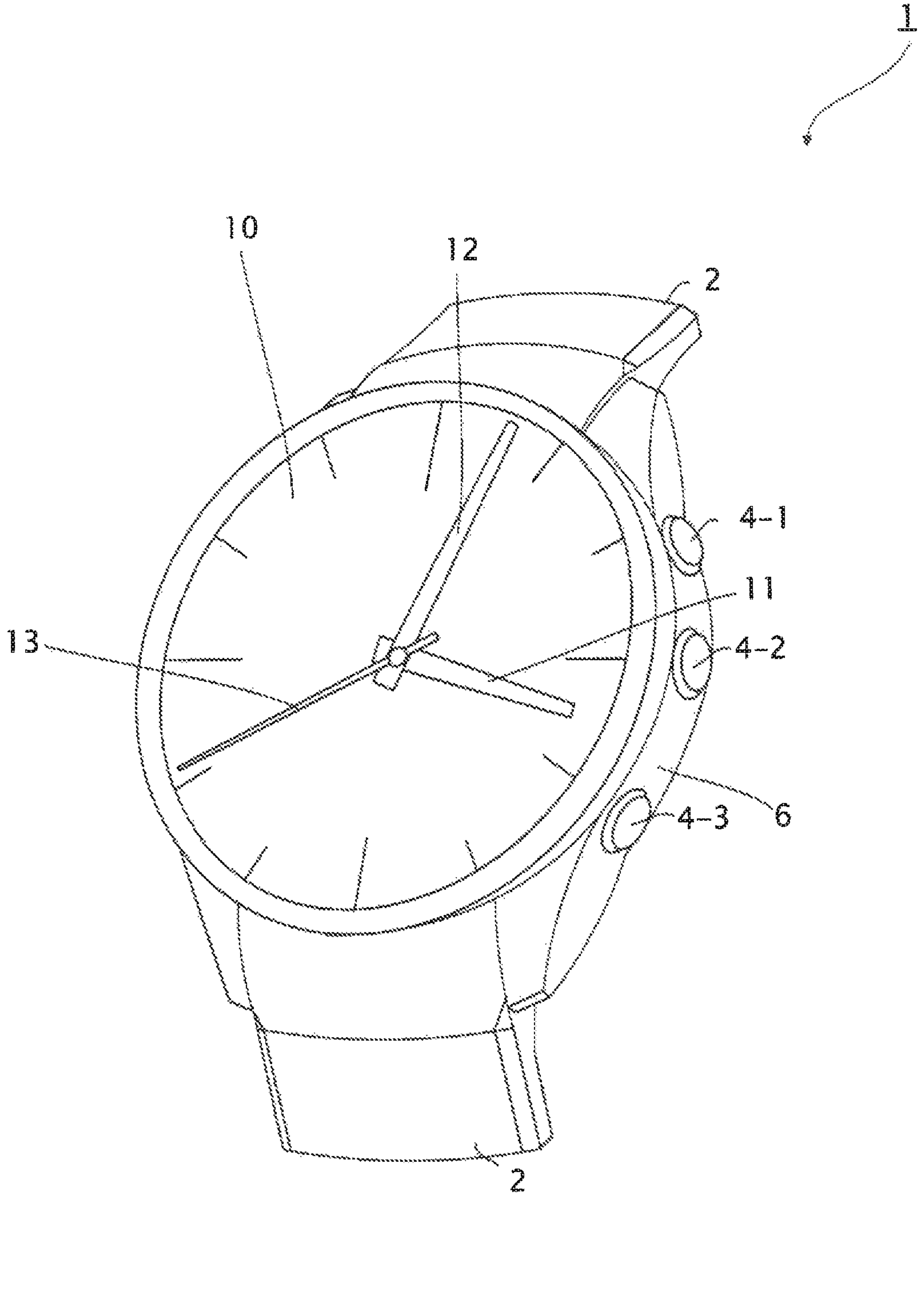
FIG. 1 is a perspective view of an electronic timepiece according to a first embodiment.

FIG. 1 illustrates a perspective view of the electronic timepiece 1 in the first embodiment. The electronic timepiece 1 indicates the time by using a movement of electrons. As illustrated in FIG. 1, the electronic timepiece 1 is a wristwatch. The electronic timepiece 1 includes a band unit 2, a button 4-1, a button 4-2, a button 4-3, a case unit 6, and a time display unit 10. The time display unit 10 includes an hour hand 11, a minute hand 12, and a second hand 13. The time display unit 10 indicates the time according to the direction of each hand, such as the hour hand 11, the minute hand 12, and the second hand 13.

Figure 2:
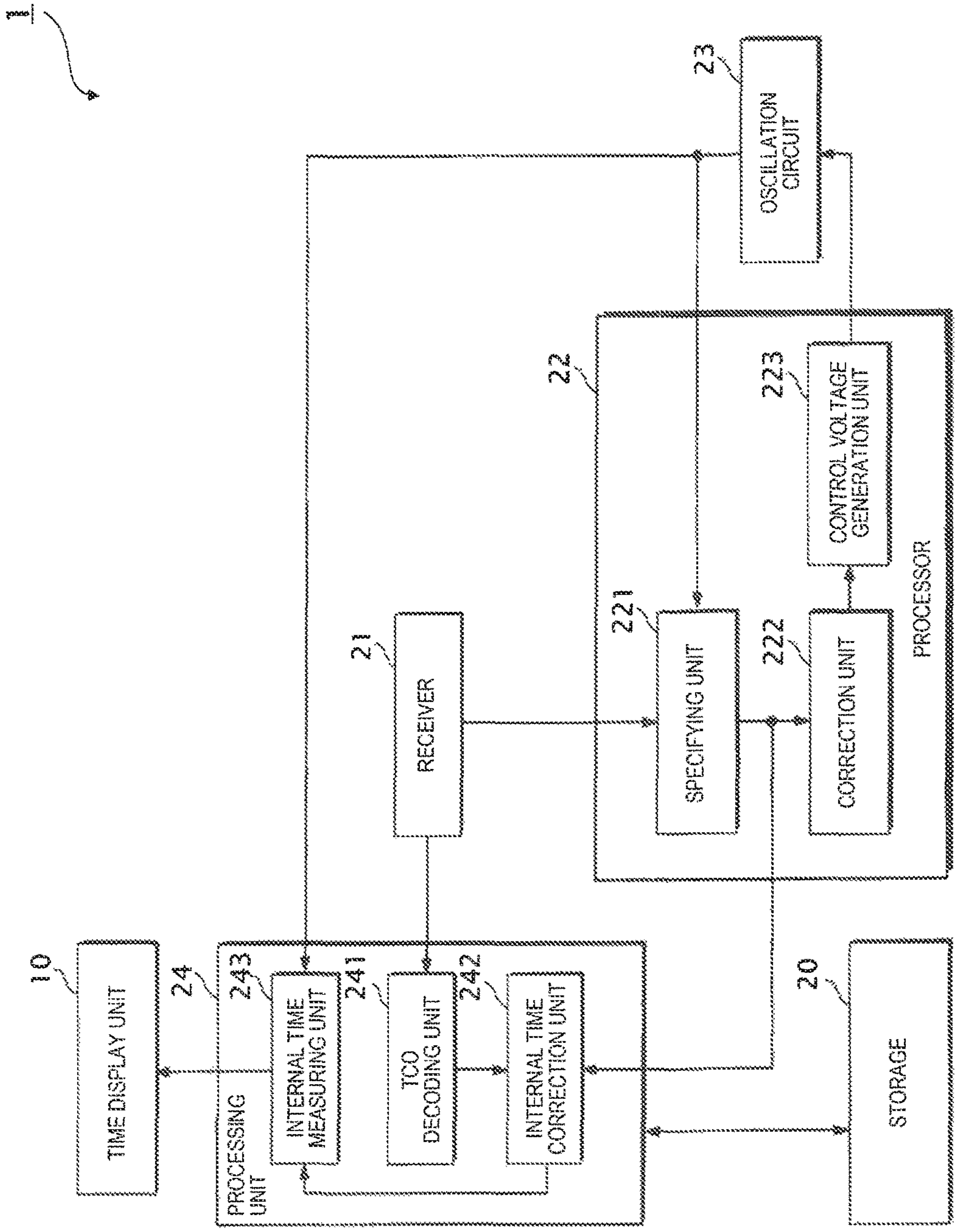
FIG. 2 is a configuration view of the electronic timepiece according to the first embodiment.

FIG. 2 illustrates a configuration view of the electronic timepiece 1 in the first embodiment. The electronic timepiece 1 includes a storage 20, a receiver 21, a processor 22, an oscillation circuit 23, a processing unit 24, and a time display unit 10. The processor 22 is an electronic circuit that executes processing designed by a designer, such as a field programmable gate array (FPGA) or an application specific IC (ASIC).

The storage 20 is a nonvolatile recording medium which is readable and writable by a computer. The storage 20 is, for example, a flash memory. The storage 20 is not limited to the flash memory, and can be appropriately changed. The storage 20 stores, for example, a program to be executed by the processing unit 24.

The receiver 21 receives a standard radio wave. The standard radio wave is transmitted as a national time and frequency standard. There are a plurality of types of standard radio waves depending on the country to which the standard radio wave is transmitted, and examples thereof include JJY (registered trademark) transmitted in Japan, WWVB transmitted in the United States, DCF77 in Germany, MSF in the UK, BPC in China, and the like. In the following description, the standard radio wave is JJY and the frequency of the carrier wave of JJY is 40 kHz. The carrier wave of the standard radio wave is generated based on the national standard, such as a cesium atomic timepiece, and is a highly accurate signal with an error of $\pm 10^{-12}$.

A.2. Time Setting by Standard Radio Wave

The receiver 21 receives the standard radio wave. The receiver 21 outputs a TCO signal obtained by demodulating the received standard radio wave to the processing unit 24. The TCO signal is a signal obtained by demodulating the standard radio wave from the time when the second at the time of the national standard time is 0 seconds until one minute elapses. In addition, the receiver 21 outputs the received standard radio wave to the processor 22.

The processing unit 24 is a computer, such as a central processing unit (CPU). The processing unit 24 controls the entire electronic timepiece 1. The processing unit 24 realizes a TCO decoding unit 241, an internal time correction unit 242, and an internal time measuring unit 243 by reading and executing a program stored in the storage 20.

From the TCO signal, the TCO decoding unit 241 extracts a time code (time information) having date information, time information and the like included in the TCO signal. In addition, the TCO decoding unit 241 outputs the extracted time code to the internal time correction unit 242.

The internal time correction unit 242 outputs the time code obtained from the TCO decoding unit 241 to the internal time measuring unit 243 and sets the value based on the time code in the counter of the internal time measuring unit 243. Accordingly, the internal time is set.

The internal time measuring unit 243 measures the internal time by a signal having 1 Hz obtained by frequency-dividing a clock signal generated by the oscillation circuit 23. Specifically, the internal time measuring unit 243 includes a second counter for counting seconds, a minute counter for counting minutes, and an hour counter for counting hours. The internal time measuring unit 243 rotates the second hand 13 in a direction that corresponds to the value of the second counter, rotates the minute hand 12 in the direction that corresponds to the value of the minute counter, and rotates the hour hand 11 in the direction that corresponds to the value of the hour counter. Accordingly, the time display unit 10 displays the internal time.

A.3. Correction of Frequency of Clock Signal Based on Standard Radio Wave and Clock Signal The oscillation circuit 23 generates the clock signal used for measuring the internal time. The oscillation circuit 23 includes a crystal oscillator. The oscillation circuit 23 is, for example, a voltage controlled oscillator (VCO) that oscillates the clock signal of a frequency that corresponds to the control voltage.

The processor 22 controls the oscillation circuit 23 such that the frequency of the clock signal is close to a reference frequency f0 based on the frequency of the carrier wave of the standard radio wave received by the receiver 21 and the frequency of the clock signal generated by the oscillation circuit 23. The reference frequency f0 is determined in accordance with the frequency of the carrier wave of the standard radio wave. For measuring one second, the reference frequency f0 is preferably a frequency at which the frequency frequency-divided by an exponentiation value of 2 becomes 1 Hz, and for example, 32.768 kHz is adopted. Hereinafter, the reference frequency f0 is assumed to be 32.768 kHz.

As described above, the frequency of the carrier wave of the standard radio wave has an extremely small error. Therefore, in a case where the frequency of the carrier wave of the standard radio wave is fc, the frequency obtained by multiplying the frequency of the carrier wave of the standard radio wave to f0/fc times can be regarded as the reference frequency f0. Hereinafter, a signal having a frequency of the reference frequency f0 is referred to as "reference wave".

More specifically, a method of controlling the oscillation circuit 23 by the processor 22 will be described. The processor 22 includes a specifying unit 221, a correction unit 222, and a control voltage generation unit 223. The specifying unit 221 specifies a difference Δfv between the reference frequency f0 and a frequency $f_{VCO}$ of the clock signal. Hereinafter, the difference between the reference frequency f0 and the frequency $f_{VCO}$ of the clock signal is referred to as "frequency difference".

In order to specify the frequency difference Δfv, the specifying unit 221 generates the reference wave from the carrier wave of the standard radio wave. Specifically, the specifying unit 221 uses a numerical controlled oscillator (NCO) as an arithmetic unit that performs the numerical arithmetic operation for converting the frequency. In addition, the specifying unit 221 performs the arithmetic operation of the NCO with respect to the carrier wave of the standard radio wave and converts the carrier wave into the reference wave. The NCO can convert the signal into a signal having any frequency. In the embodiment, as described above, since the frequency of the carrier wave of the standard radio wave is 40 kHz, by multiplying the frequency of the carrier wave of the standard radio wave by $f0/(40\times10^3)$, it is possible to convert the carrier wave of the standard radio wave into the reference wave.

Next, the specifying unit 221 specifies the frequency difference Δfv based on the first phase difference between the reference wave and the clock signal at a time t1 (example of "first time"), the second phase difference between the reference wave and the clock signal at a time t2 (example of "second time"), and a time period PDI from the time t1 to the time t2. It is preferable that the time period PDI is less than one cycle of the reference frequency f0. Specifically, the specifying unit 221 combines the reference wave and the clock signal to each other, and generates a combined signal (referred to as an I signal) and a signal (referred to as a Q signal) obtained by delaying the I signal by a π/2 phase. Next, from the I signal and the Q signal, the specifying unit 221 specifies a value $I_{t1}$ of the I signal and a value $Q_{t1}$ of the Q signal at the time t1 when the time period PDI has elapsed from a measurement start time, and a value $I_{t2}$ of the I signal and a value $Q_{t2}$ of the Q signal at the time t2 when the time period PDI has further elapsed from the time t1.

Figure 3:
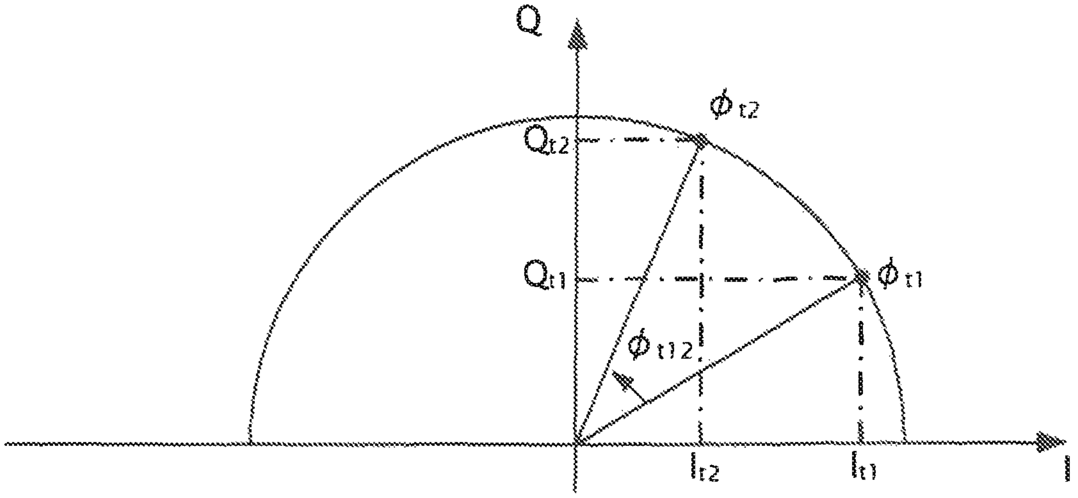
FIG. 3 is a view illustrating a relationship of $I_{t1}$, $Q_{t1}$, $I_{t2}$, and $Q_{t2}$.

FIG. 3 illustrates a relationship of $I_{t1}$, $Q_{t1}$, $I_{t2}$, and $Q_{t2}$. As illustrated in FIG. 3, a phase difference between the reference wave and the clock signal is represented by a complex number in the I signal and the Q signal. The phase change amount $\Delta\phi_{t12}$ of the second phase difference from the first phase difference is expressed by the following equation (1).

$$\Delta\phi_{t12}=\phi_{t2}-\phi_{t1} \quad (1)$$

$\phi_{t1}$ is the first phase difference. $\phi_{t2}$ is the second phase difference. $\phi_{t1}=I_{t1}+jQ_{t1}$, and $\phi_{t2}=I_{t2}+jQ_{t2}$. j is an imaginary unit. From the trigonometry, the equation (1) is converted into the following equation (2) by using X=Cross/Dot.

$$\Delta\phi_{t12}=\tan^{-1}(X) \quad (2)$$

Here, $Cross=I_{t1}*Q_{t2}-I_{t2}*Q_{t1}$, and $Dot=I_{t1}*I_{t2}+Q_{t1}*Q_{t2}$. Furthermore, $\Delta\phi_{t12}$ is expressed by the following equation (3).

$$\Delta\phi_{t12}+2n\pi=2\pi*PDI*f_{VCO} \quad (3)$$

n is an integer of 0 or more. Here, the time period PDI during which n=0 is $0<\Delta\phi_{t12}<2\pi$ and is obtained as follows by using the expression (3).

$$0<\Delta\phi_{t12}<2\pi \Leftrightarrow 0<2\pi*PDI*f_{VCO}<2\pi \Leftrightarrow 0<PDI<1/f_{VCO}$$

The frequency $f_{VCO}$ of the clock signal becomes a value close to the reference frequency f0. Therefore, the time period PDI is less than one cycle of the reference frequency f0, and it is possible to make substantially n=0. However, in a case where the frequency $f_{VCO}$ of the clock signal becomes greater than the reference frequency f0, when the time period PDI is close to one cycle of the reference frequency f0, there is a concern that n is equal to or greater than 1. Therefore, it is preferable that the difference between $I_{t1}$ and $I_{t2}$ and the difference between $Q_{t1}$ and $Q_{t2}$ can be sufficiently measured and the time period PDI is sufficiently smaller than one cycle of the reference frequency f0. By setting that n=0 is possible, the arithmetic operation related to the specification of the frequency difference Δfv is simplified and the time taken for the arithmetic operation is shortened. When n=0, the frequency $f_{VCO}$ of the clock signal is expressed by the following equation (4) by using the equations (2) and (3).

$$f_{VCO}=\tan^{-1}(X)/(\mathrm{PDI}*2\pi) \quad (4)$$

In addition, from the frequency difference Δfv=the frequency $f_{VCO}$ of the clock signal—the reference frequency f0, the specifying unit 221 specifies the frequency difference Δfv by using the expression (4).

The description returns to FIG. 2.

The correction unit 222 controls the oscillation circuit 23 and corrects the frequency $f_{VCO}$ of the clock signal so as to be close to the reference frequency f0, based on the frequency difference Δfv. More specifically, the correction unit 222 corrects the frequency of the clock signal by controlling the oscillation circuit 23 such that the voltage based on the frequency difference Δfv is input to the oscillation circuit 23. For example, the correction unit 222 supplies data indicating the voltage at which the frequency difference Δfv is canceled to a control voltage generation unit 223. The control voltage generation unit 223 D/A converts the supplied data and outputs the control voltage indicated by the data to the oscillation circuit 23.

The voltage at which the frequency difference Δfv is canceled will be described more specifically. A case where the oscillation circuit 23 to which a voltage V0 is input at a first timing oscillates the clock signal of the reference frequency f0 and the specifying unit 221 specifies the frequency difference Δfv at a second timing, is assumed. In a case where the time period from the first timing to the second timing is long, the frequency of the clock signal changes due to the change with time of the oscillation circuit 23. In addition, even in a case where the temperature at the first timing is different from the temperature at the second timing, the frequency of the clock signal changes. In such a case, the correction unit 222 cancels the frequency difference Δfv at the second timing and notifies the control voltage generation unit 223 of the data in which the frequency of the clock signal is set as the reference frequency f0. For example, in a case where the magnitude of the control voltage that corresponds to the frequency difference Δfv is "−ΔV", the control voltage generation unit 223 outputs the data indicating "V0−ΔV".

The internal time correction unit 242 corrects the internal time based on the frequency difference Δfv and the number of clock signals from the time when the internal time is set based on the time information of the standard radio wave to the current time. A specific correction method will be described. At the first timing, it is assumed that the receiver 21 receives the standard radio wave, the TCO decoding unit 241 extracts the time code from the TCO signal obtained by demodulating the standard radio wave, and the internal time correction unit 242 sets the internal time in accordance with the time code. Furthermore, at the first timing, it is assumed that the specifying unit 221 specifies a frequency difference Δfv0 based on the carrier wave of the standard radio wave received by the receiver 21 and the clock signal, and the correction unit 222 makes the frequency $f_{VCO}$ of the clock signal match the reference frequency f0 based on the frequency difference Δfv0. In addition, it is assumed that the receiver 21 receives the standard radio wave again at the second timing after the first timing and the specifying unit 221 specifies the frequency difference Δfv based on the carrier wave of the standard radio wave received by the receiver 21 and the clock signal.

In a case of receiving the frequency difference Δfv, the internal time correction unit 242 adds the number of clock signals*(1/(f0+Δfv)−1/f0) from the time when the internal time is set at the first timing to the current time, to the present internal time. (1/(f0+Δfv)−1/f0) indicates an error from an accurate time generated as one clock elapses. For example, in a case where the Δfv is a positive value, the time period of one clock after the first timing becomes short and the internal time is advanced from the accurate time. In addition, since 1/(f0+Δfv)−1/f0 becomes a negative value, the internal time correction unit 242 reduces the value of the internal time, and thus, the internal time can be close to the accurate time.

Figure 4:
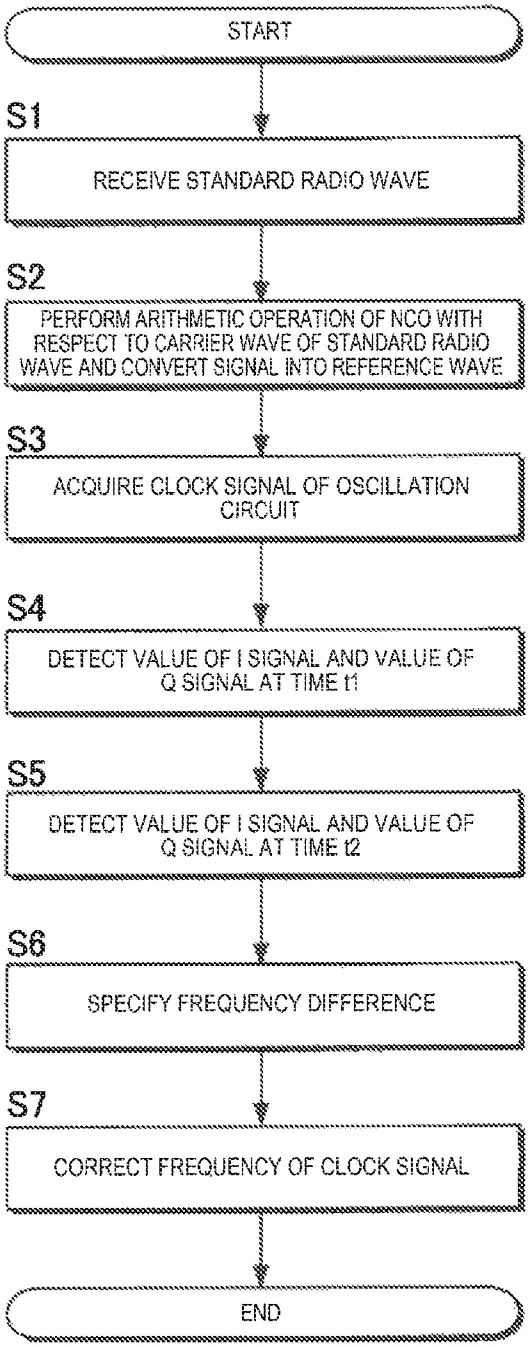
FIG. 4 is a view illustrating a flowchart of a frequency correction processing.

FIG. 4 is a view illustrating a flowchart of a frequency correction processing. The receiver 21 receives the standard radio wave (step S1). The specifying unit 221 performs the arithmetic operation of the NCO with respect to the carrier wave of the received standard radio wave and converts the carrier wave into the reference wave (step S2).

Next, the specifying unit 221 acquires the clock signal of the oscillation circuit 23 (step S3). In addition, the specifying unit 221 detects the value $I_{t1}$ of the I signal and the value $Q_{t1}$ of the Q signal at the time t1 from the I signal and the Q signal obtained by combining the reference wave and the clock signal with each other (step S4). Subsequently, the specifying unit 221 detects the value $I_{t2}$ of the I signal and the value $Q_{t2}$ of the Q signal at time t2 (step S5). In addition, the specifying unit 221 specifies the frequency difference Δfv by using the expression (4) based on $I_{t1}$, $Q_{t1}$, $I_{t2}$, $Q_{t2}$, and the time period PDI (step S6).

The correction unit 222 corrects the frequency $f_{VCO}$ of the clock signal based on the frequency difference Δfv (step S7). After the processing of step S7 is ended, the electronic timepiece 1 ends the series of processing.

A.4. Effect of First Embodiment

As described above, the processor 22 controls the oscillation circuit 23 such that the frequency $f_{VCO}$ of the clock signal is close to the reference frequency f0 based on the frequency of the carrier wave of the standard radio wave and the frequency $f_{VCO}$ of the clock signal. In this manner, since the frequency $f_{VCO}$ of the clock signal is controlled by using the carrier wave of the standard radio wave of which the frequency is managed with high accuracy, the frequency $f_{VCO}$ of the clock signal is always corrected by receiving the standard radio wave, and accordingly, it becomes possible for the internal time to continue showing the accurate time. In addition, as described above, the TCO signal indicates the time information for one minute from the time when the second in the time of the national standard time is 0 seconds until one minute elapses. Therefore, when the standard radio wave cannot be received at a part of the period during which one minute elapses, the receiver 21 cannot demodulate the standard radio wave and the TCO signal cannot be obtained. As a result, the electronic timepiece 1 cannot set the internal time. Therefore, the accuracy of the internal time deteriorates until the TCO signal is obtained. For example, this corresponds to a case where a reception intensity of the standard radio wave temporarily deteriorates under the influence of noise or the like.

However, in the first embodiment, even with the standard radio wave of which a part cannot be received, by always correcting the frequency $f_{VCO}$ of the clock signal by using the carrier wave of the standard radio wave of a part that can be received, it becomes possible for the internal time to continue showing the accurate time. When it is possible to maintain the frequency difference Δfv/reference frequency f0 to be ±0.03 parts per million (ppm) by correcting the frequency $f_{VCO}$ of the clock signal, it becomes possible to realize an annual difference of ±1 second.

Further, the specifying unit 221 specifies the frequency difference fv between the reference frequency f0 and the frequency of the clock signal, and the correction unit 222 controls the oscillation circuit 23 based on the frequency difference Δfv specified by the specifying unit 221 and corrects the frequency $f_{VCO}$ of the clock signal so as to be close to the reference frequency f0. By controlling the oscillation circuit 23 such that the specified frequency difference Δfv is canceled, the correction unit 222 can make the frequency fv of the clock signal close to the reference frequency f0.

In addition, the specifying unit 221 performs the arithmetic operation of the NCO with respect to the carrier wave of the standard radio wave and converts the carrier wave into the reference wave. Accordingly, it becomes possible to obtain the reference wave with high accuracy.

Further, the specifying unit 221 specifies the frequency difference Δfv based on the first phase difference, the second phase difference, and the time period PDI. In the method of specifying the frequency difference Δfv based on the phase difference, it becomes possible to specify the frequency difference Δfv/reference frequency f0 with accuracy of $\pm 10^{-7}$ in a short period of time of several tens of milliseconds to several seconds or less.

A case where the method of specifying the frequency difference Δfv based on the phase difference is performed in a short period of time will be described. In the method of specifying the frequency difference Δfv based on the phase difference, in order to obtain X in the above-described equation (2), the time from the measurement start time to the time t2 elapses, and thus, a time period of the time period PDI*2 becomes necessary. Since the time period PDI becomes approximately 1/reference frequency f0 at the longest, the time period $PDI*2=2/(32.768*10^3)$=approximately 0.06 msec. As described above, it becomes possible to perform the method of specifying the frequency difference Δfv based on the phase difference in a short period of time of several tens of milliseconds to several seconds or less even when the time period PDI*2 is approximately 0.06 msec at the longest and the time required for the arithmetic operation of the expression (4) is added.

Meanwhile, as a method of obtaining a difference between two frequencies, there is a so-called counter method of counting the number of cycles of the other frequency within a time period obtained by multiplying one cycle of one frequency that serves as a reference by n (n is a natural number) and specifying the other frequency, and specifying the difference between one frequency and the other frequency. However, in the counter method, when it is attempted to specify the frequency difference Δfv/reference frequency f0 with accuracy of ppm, a relatively long period of time is required. More specifically, the accuracy obtained by the counter system depends on the number of clocks of the other frequency within a fixed time period. Therefore, in order to increase the accuracy with the counter method, it becomes necessary to increase n in order to increase the number of clocks of the other frequency, and thus, the counter method is not practical at a low frequency, such as 32.768 kHz. In this manner, the method of specifying the frequency difference Δfv based on the phase difference can be performed in a shorter period of time than that in the counter method.

Since it becomes possible to specify the frequency difference Δfv in a short period of time, it becomes easy to correct the internal time in a short period of time.

In addition, the correction unit 222 corrects the frequency of the clock signal by controlling the oscillation circuit 23 such that the control voltage based on the frequency difference Δfv is input to the oscillation circuit 23. Accordingly, the voltage based on the frequency difference Δfv is input to the oscillation circuit 23, it is possible to correct the frequency $f_{VCO}$ of the clock signal, and it becomes possible for the internal time to continue showing the accurate time.

In addition, the internal time correction unit 242 corrects the internal time based on the frequency difference Δfv and the number of clock signals from the time when the internal time is set based on the standard radio wave to the current time. Accordingly, in the electronic timepiece 1, it becomes possible to reduce the load on the correction of the internal time compared to a case where the internal time is set by always using a TCO signal in a case where the standard radio wave is received. Specifically, in order to obtain the TCO signal, it is necessary to demodulate the standard radio wave, but in a case where the internal time is corrected by using the carrier wave of the standard radio wave, the standard radio wave may not be demodulated. Therefore, by correcting the internal time by using the difference between the reference frequency and the frequency of the clock signal, compared to a case where the internal time is corrected by always using the TCO signal in a case where the standard radio wave is received, it becomes possible to reduce the load on the correction of the internal time, and to complete the correction in a short period of time.

In addition, in a case of setting the internal time by using the TCO signal, in JJY, as described above, since the TCO signal is transmitted over 1 minute, it takes at least 1 minute to set the internal time. In contrast, in a case of correcting the internal time by using the frequency difference Δfv, the frequency difference Δfv can be specified within a short period of time of several tens of milliseconds to several seconds or less.

B. Second Embodiment

In general, due to the adherence and removal of dust to and from the crystal oscillator occurring in an air-tightly sealed container of the oscillation circuit 23, the environmental change due to some outgas, the change over the years of an adhesive used in the oscillation circuit 23, or the like, the frequency of the clock signal generated in a case where a predetermined control voltage is input changes. Here, in the second embodiment, the electronic timepiece 1 has cumulative operation time characteristic information 251 (refer to FIG. 5) related to the cumulative operation time of the oscillation circuit 23 and the frequency of the clock signal generated in a case where the predetermined control voltage is input to the oscillation circuit 23, and the correction unit 222 updates the cumulative operation time characteristic information 251 by using the frequency difference Δfv. The characteristic indicated by the cumulative operation time characteristic information 251 is a so-called aging characteristic. The control voltage generation unit 223 corrects the frequency of the clock signal of the oscillation circuit 23 by generating the control voltage such that the deterioration characteristic due to the cumulative operation time indicated by the updated cumulative operation time characteristic information 251 is canceled. Hereinafter, the second embodiment will be described. In addition, in each aspect and each modification example described below, elements having the same operations or functions as those in the first embodiment will be given the same reference numerals as those used in the first embodiment, and the detailed description thereof will be appropriately omitted.

B.1. Outline of Electronic Timepiece 1 According to Second Embodiment

Figure 5:
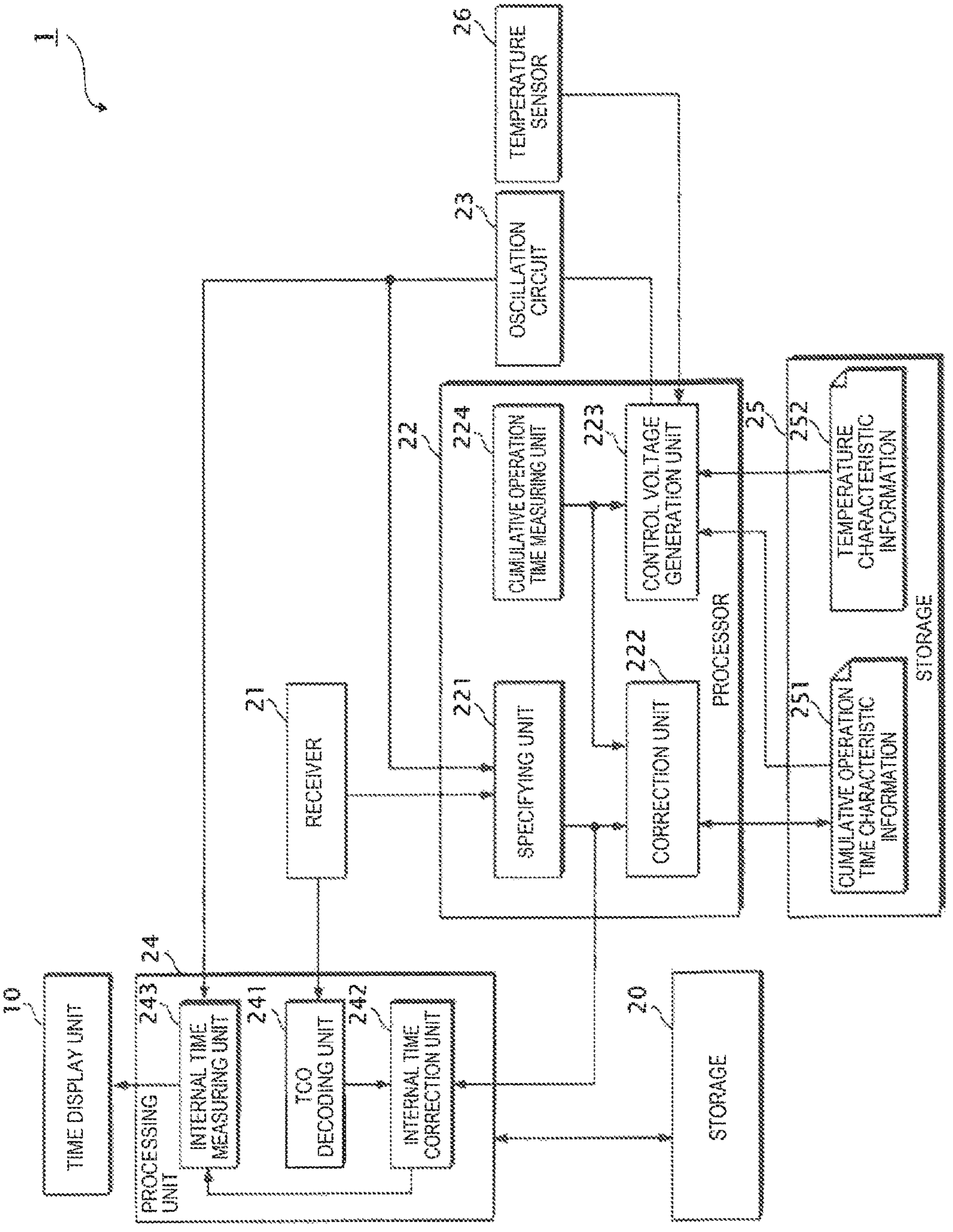
FIG. 5 is a configuration view of an electronic timepiece according to a second embodiment.

FIG. 5 illustrates a configuration view of the electronic timepiece 1 in the second embodiment. The electronic timepiece 1 further includes a storage 25 and a temperature sensor 26. The processor 22 includes a cumulative operation time measuring unit 224.

The storage 25 is a readable and writeable nonvolatile recording medium. The storage 25 is, for example, an electrically erasable programmable read-only memory (EEPROM). The storage 25 is not limited to the EEPROM, and can be appropriately changed. The storage 25 includes the cumulative operation time characteristic information 251 and temperature characteristic information 252.

The temperature sensor 26 measures the temperature of the oscillation circuit 23. The cumulative operation time measuring unit 224 measures the elapsed time from the time when the oscillation circuit 23 is incorporated in the electronic timepiece 1 and starts an operation. Therefore, the time measured by the cumulative operation time measuring unit 224 indicates the cumulative operation time of the oscillation circuit 23.

The cumulative operation time characteristic information 251 indicates a relationship between the cumulative operation time of the oscillation circuit 23 and the frequency of the clock signal generated in a case where a predetermined control voltage is input to the oscillation circuit 23. The predetermined voltage is, for example, a voltage V0 that oscillates the clock signal of the reference frequency f0 in a case where the cumulative operation time is 0. The cumulative operation time characteristic information 251 has two aspects. The cumulative operation time characteristic information 251 in the first aspect indicates a relationship between the cumulative operation time of the oscillation circuit 23 and the frequency of the clock signal generated in a case where the voltage V0 is input to the oscillation circuit 23. The cumulative operation time characteristic information 251 in the second aspect indicates a relationship between the cumulative operation time of the oscillation circuit 23 and a frequency error Δfe of the frequency $f_{VCO}$ of the clock signal generated in a case where the voltage V0 is input to the oscillation circuit 23. The frequency error Δfe (example of "error in frequency of the clock signal") is a difference between the frequency $f_{VCO}$ of the clock signal and the reference frequency f0. Hereinafter, the cumulative operation time characteristic information 251 is assumed to be the second aspect.

The frequency difference Δfv and the frequency error Δfe match each other in terms of the difference between the reference frequency f0 and the frequency $f_{VCO}$ of the clock signal. However, in order to clarify the following description more clearly, the difference specified by the specifying unit 221 will be referred to as "frequency difference", and the difference stored in the cumulative operation time characteristic information 251 and the temperature characteristic information 252 will be referred to as "frequency error".

For example, the cumulative operation time characteristic information 251 indicates the frequency error Δfe of the clock signal generated in a case where the voltage V0 is input to the oscillation circuit 23 for each of the cumulative operation time of 1 month, 2 months, . . . , 1 year, . . . , and n years. The frequency error Δfe indicated by the cumulative operation time characteristic information 251 is, for example, a value obtained by performing an experiment with respect to the same oscillation circuit as the oscillation circuit 23.

The temperature characteristic information 252 indicates the characteristics due to the temperature change of a crystal oscillator in the oscillation circuit 23. The temperature characteristic information 252 relates to the temperature that can be obtained by the oscillation circuit 23 and the frequency of the clock signal generated in a case where the predetermined voltage is input to the oscillation circuit 23. The predetermined voltage is, for example, the voltage V0. There are two aspects in the temperature characteristic information 252. The temperature characteristic information 252 in the first aspect indicates a relationship between the temperature that can be obtained by the oscillation circuit 23 and the frequency of the clock signal generated in a case where the voltage V0 is input to the oscillation circuit 23. The temperature characteristic information 252 in the second aspect indicates a relationship between the temperature that can be obtained by the oscillation circuit 23 and the frequency error Δfe between the frequency $f_{VCO}$ of the clock signal generated in a case where the voltage V0 is input to the oscillation circuit 23 and the reference frequency f0. Hereinafter, the temperature characteristic information 252 is assumed to be the second aspect.

For example, the temperature characteristic information 252 indicates the frequency error Δfe of the clock signal generated in a case where the voltage V0 is input to the oscillation circuit 23 for each of 10° C., 15° C., 20° C., 25° C., 30° C., 35° C. and the like. The frequency error Δfe indicated by the temperature characteristic information 252 is, for example, a value obtained by performing an experiment with respect to the same oscillation circuit as the oscillation circuit 23.

The correction unit 222 updates the cumulative operation time characteristic information 251 based on the frequency difference Δfv specified by the specifying unit 221 and the cumulative operation time of the oscillation circuit 23 at the point of time when the specifying unit 221 specifies the frequency difference Δfv, and corrects the frequency of the clock signal. A specific example of updating the cumulative operation time characteristic information 251 will be described with reference to FIG. 6.

Figure 6:
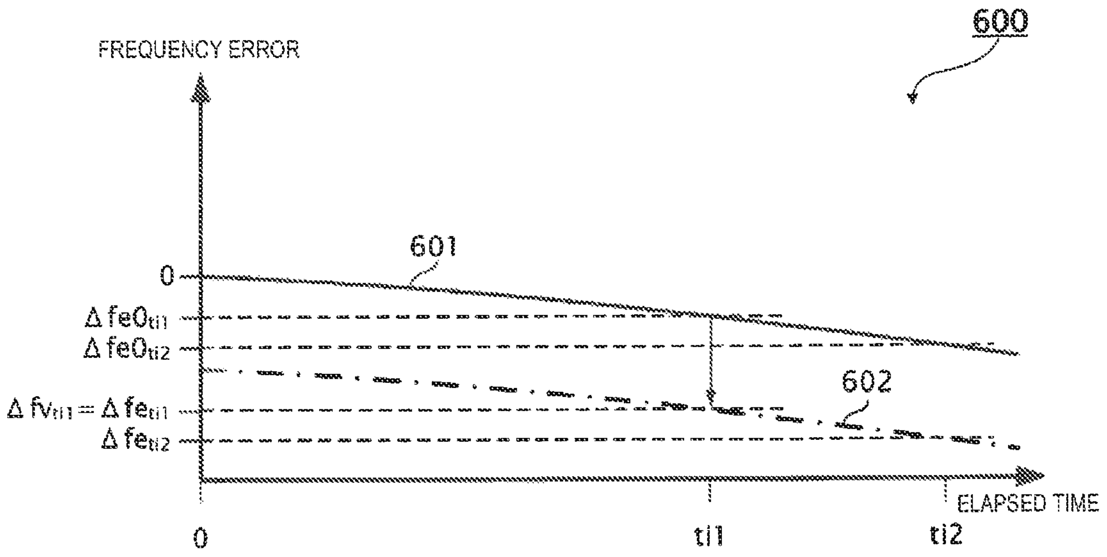
FIG. 6 is a view illustrating an example of updating cumulative operation time characteristic information.

FIG. 6 is a view illustrating an example of updating the cumulative operation time characteristic information 251. A graph 600 illustrated in FIG. 6 indicates the frequency error Δfe that corresponds to the cumulative operation time of the oscillation circuit 23. A cumulative operation time characteristic 601 indicated in the graph 600 is a characteristic indicated by the cumulative operation time characteristic information 251 before the update by the correction unit 222. The reason why the frequency error Δfe becomes a value other than zero as time elapses is the adherence and removal of dust to and from the crystal oscillator occurring in an air-tightly sealed container of the oscillation circuit 23, the environmental change due to some outgas, the change over the years of an adhesive used in the oscillation circuit 23, or the like. In the example illustrated in FIG. 6, the frequency error Δfe=0 is achieved at the time of manufacturing, but as the time elapses, the frequency error Δfe increases in a negative direction. More specifically, the cumulative operation time characteristic information 251 indicates that a frequency error $\Delta fe0_{ti1}$ is obtained in a case where the cumulative operation time is a time ti1, and a frequency error $\Delta fe0_{ti2}$ is obtained in a case where the cumulative operation time is a time ti2.

In a case where the cumulative operation time is a first time, it is assumed that the specifying unit 221 specifies the frequency difference Δfv. The correction unit 222 updates the frequency error Δfe at the first time of the cumulative operation time characteristic information 251 to the same value as the frequency difference Δfv. At this time, a value obtained by subtracting the frequency error Δfe before the update from the frequency difference Δfv is stored. The correction unit 222 adds the stored value to the frequency error Δfe at the time other than the first time of the cumulative operation time characteristic information 251.

A specific example of updating the cumulative operation time characteristic information 251 will be described. In a case where the cumulative operation time is the time ti1, it is assumed that the specifying unit 221 specifies a frequency difference $\Delta fv_{ti1}$. The correction unit 222 updates the frequency error $\Delta fe0_{ti1}$ at the first time ti1 of the cumulative operation time characteristic information 251 to a frequency difference $\Delta fe_{ti1}$. The frequency error $\Delta fe_{ti1}$ is the same value as the frequency difference $\Delta fv_{ti1}$. Furthermore, the correction unit 222 adds the frequency difference $\Delta fv_{ti1}$—the frequency error $\Delta fe0_{ti1}$ to the frequency error Δfe at the time other than the time ti1 of the cumulative operation time characteristic information 251. A cumulative operation time characteristic 602 indicated in the graph 600 is a characteristic indicated by the updated cumulative operation time characteristic information 251. The cumulative operation time characteristic 602 is a characteristic in which the cumulative operation time characteristic 601 is translated in parallel by the frequency difference $\Delta fv_{ti1}$—the frequency error $\Delta fe0_{ti1}$. For example, the correction unit 222 adds the frequency difference $\Delta fv_{ti1}$—the frequency error $\Delta fe0_{ti1}$ to the frequency error $\Delta fe0_{ti2}$ at the time ti2 of the cumulative operation time characteristic information 251, and updates the value as a frequency error $\Delta fe_{ti2}$ as illustrated in FIG. 6.

The description returns to FIG. 5.

By using the updated cumulative operation time characteristic information 251, the control voltage generation unit 223 specifies a frequency error $\Delta fe_{ti}$ that corresponds to the current cumulative operation time indicated by the cumulative operation time measuring unit 224. Furthermore, by using the temperature characteristic information 252, the control voltage generation unit 223 specifies a frequency error $\Delta fe_{te}$ that corresponds to the current temperature indicated by the temperature sensor 26.

In addition, the control voltage generation unit 223 generates the control voltage such that the frequency error $\Delta fe_{ti}$ and the frequency error $\Delta fe_{te}$ are canceled, and outputs the generated control voltage to the oscillation circuit 23. For example, the control voltage generation unit 223 generates the control voltage V0−ΔVti−ΔVte such that the frequency error $\Delta fe_{ti}$ and the frequency error $\Delta fe_{te}$ are canceled. The magnitude of the control voltage that corresponds to the frequency error $\Delta fe_{ti}$ is "−ΔVti". In addition, the magnitude of the control voltage that corresponds to the frequency error $\Delta fe_{te}$ is "−ΔVte".

B.2. Effect of Second Embodiment

As described above, the correction unit 222 updates the cumulative operation time characteristic information 251 based on the frequency difference Δfv and the cumulative operation time of the oscillation circuit 23 at the point of time when the frequency difference Δfv is specified, and corrects the frequency of the clock signal. Accordingly, in the electronic timepiece 1, when the time has elapsed after the frequency difference Δfv was specified, even in a case where the standard radio wave is not received, it becomes possible to correct the frequency of the clock signal by using the updated cumulative operation time characteristic information 251.

C. Third Embodiment

In the second embodiment, the correction unit 222 updates the cumulative operation time characteristic information 251, and the control voltage generation unit 223 corrects the frequency of the clock signal of the oscillation circuit 23 by generating the control voltage such that the deterioration due to the cumulative operation time indicated by the updated cumulative operation time characteristic information 251 is canceled. Meanwhile, in a third embodiment, the correction unit 222 updates the temperature characteristic information 252, and the control voltage generation unit 223 corrects the frequency of the clock signal of the oscillation circuit 23 by generating the control voltage such that the temperature change indicated by the updated temperature characteristic information 252 is canceled. Hereinafter, the third embodiment will be described. In addition, in each aspect and each modification example described below, elements having the same operations or functions as those in the second embodiment will be given the same reference numerals as those used in the second embodiment, and the detailed description thereof will be appropriately omitted.

C.1. Outline of Electronic Timepiece 1 According to Third Embodiment

Figure 7:
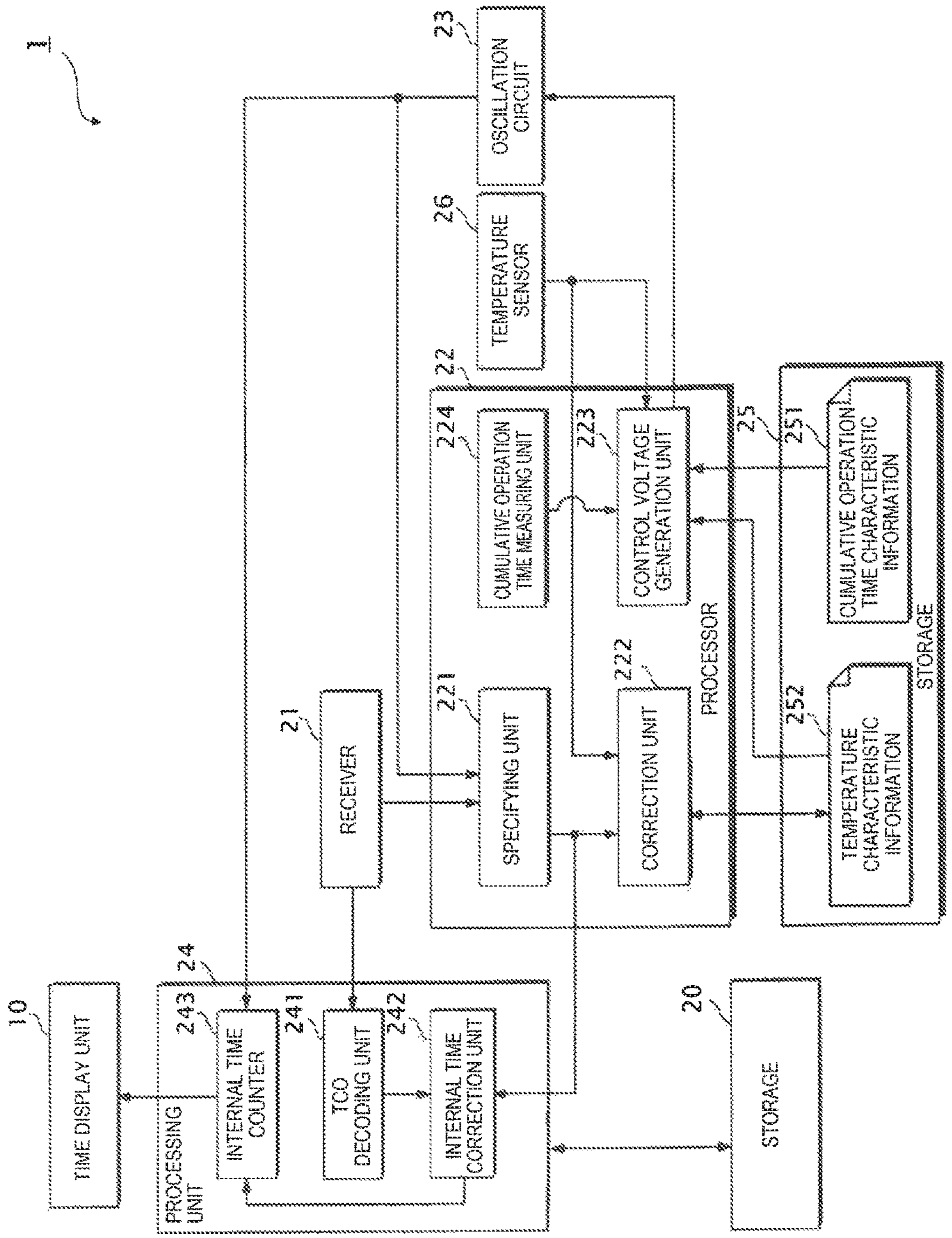
FIG. 7 is a configuration view of an electronic timepiece according to a third embodiment.

FIG. 7 illustrates a configuration view of the electronic timepiece 1 in the third embodiment. The correction unit 222 updates the temperature characteristic information 252 based on the frequency difference Δfv specified by the specifying unit 221 and the temperature of the oscillation circuit 23 at the point of time when the specifying unit 221 specifies the frequency difference Δfv, and corrects the frequency of the clock signal. A specific example of updating the temperature characteristic information 252 will be described with reference to FIG. 8.

Figure 8:
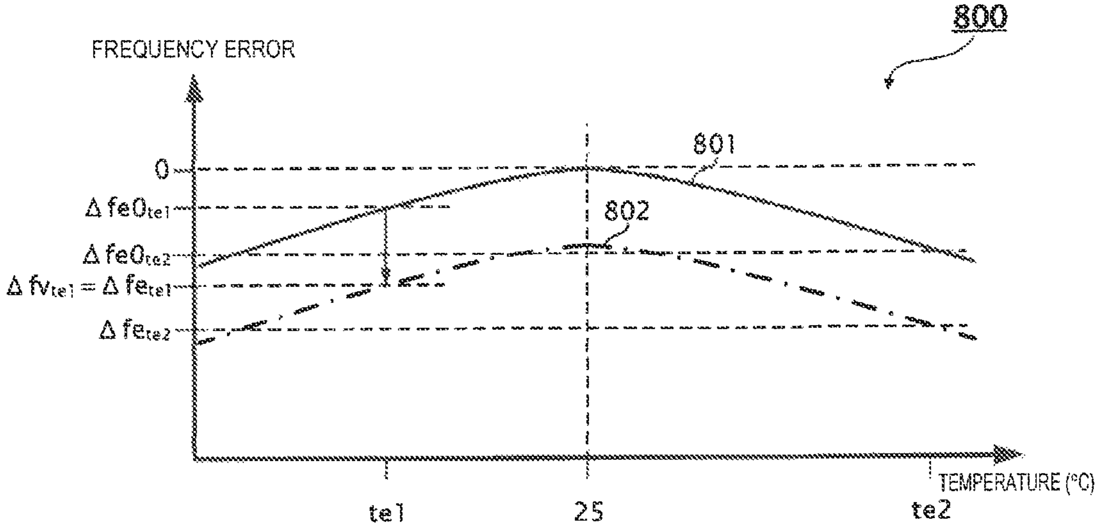
FIG. 8 is a view illustrating an example of updating temperature characteristic information.

FIG. 8 is a view illustrating an example of updating the temperature characteristic information 252. A graph 800 illustrated in FIG. 8 indicates the frequency error Δfe that corresponds to the temperature of the oscillation circuit 23. A temperature characteristic 801 indicated in the graph 800 is the characteristic indicated by the temperature characteristic information 252 before the correction by the correction unit 222. In the example illustrated in FIG. 8, the frequency error Δfe=0 at 25° C. according to the environment in which the electronic timepiece 1 is used, and the frequency error Δfe increases in the negative direction as being separated from 25° C. More specifically, the temperature characteristic information 252 indicates that a frequency error $\Delta fe0_{te1}$ is achieved in a case where the temperature is a temperature te1 of the oscillation circuit 23, and a frequency error $\Delta fe0_{te2}$ is achieved in a case where the temperature of the oscillation circuit 23 is a temperature te2.

In a case where the temperature of the oscillation circuit 23 is a first temperature, it is assumed that the specifying unit 221 specifies the frequency difference Δfv. The correction unit 222 updates the frequency error Δfe at the first temperature of the temperature characteristic information 252 to the same value as the frequency difference Δfv. At this time, a value obtained by subtracting the frequency error Δfe before the update from the frequency difference Δfv is stored. The correction unit 222 adds the stored value to the frequency error Δfe at the temperature other than the first temperature of the temperature characteristic information 252.

In a case where the temperature of the oscillation circuit 23 is the temperature te1, it is assumed that the specifying unit 221 specifies a frequency difference $\Delta fv_{te1}$. The correction unit 222 updates the frequency error $\Delta fe0_{te1}$ at the temperature te1 of the temperature characteristic information 252 to a frequency error $\Delta fe_{te1}$. The frequency error $\Delta fe_{te1}$ is the same value as the frequency difference $\Delta fv_{te1}$. Furthermore, the correction unit 222 adds the frequency difference $\Delta fv_{te1}$—the frequency error $\Delta fe0_{te1}$ to the frequency error Δfe at the temperature other than the temperature te1 of the temperature characteristic information 252. A temperature characteristic 802 indicated in the graph 800 is the characteristic indicated by the updated temperature characteristic information 252. The temperature characteristic 802 is a characteristic in which the temperature characteristic 801 is translated in parallel by the frequency difference $\Delta fv_{te1}$—the frequency error $\Delta fe0_{te1}$. For example, the correction unit 222 adds the frequency difference $\Delta fv_{te1}$—the frequency error $\Delta fe0_{te1}$ to the frequency error $\Delta fe0_{te2}$ at the time te2 of the temperature characteristic information 252, and updates the value as a frequency error $\Delta fe_{te2}$ as illustrated in FIG. 8.

The description returns to FIG. 7.

By using the cumulative operation time characteristic information 251, the control voltage generation unit 223 specifies the frequency error $\Delta fe_{ti}$ that corresponds to the current cumulative operation time indicated by the cumulative operation time measuring unit 224. Furthermore, by using the updated temperature characteristic information 252, the control voltage generation unit 223 specifies the frequency error $\Delta fe_{te}$ that corresponds to the current temperature indicated by the temperature sensor 26. Since the processing of the subsequent control voltage generation unit 223 is the same as that of the second embodiment, the description thereof will be omitted.

C.2. Effect of Third Embodiment

As described above, the correction unit 222 updates the temperature characteristic information 252 based on the specified frequency difference Δfv and the temperature of the oscillation circuit 23 at the point of time when the frequency difference Δfv is specified, and corrects the frequency of the clock signal. Accordingly, in the electronic timepiece 1, at a temperature different from the temperature when the frequency difference Δfv was specified, even in a case where the standard radio wave is not received, it becomes possible to correct the frequency of the clock signal by using the updated temperature characteristic information 252.

D. Modification Example

Each of the above-described aspects can be variously modified. Specific aspects of modifications are exemplified below. Two or more aspects which are selected in any manner from the following examples can be appropriately combined with each other within a range of not being mutually contradictory. In addition, in the modification example exemplified below, the elements having the same operations or functions as those in the embodiments will be given the same reference numerals as those used in the above-described embodiments, and the detailed description thereof will be appropriately omitted.

In each of the above-described aspects, it is assumed that the frequency $f_{VCO}$ of the clock signal is corrected every time the receiver 21 receives the standard radio wave, but the invention is not limited thereto. For example, even when the receiver 21 receives the standard radio wave, the frequency $f_{VCO}$ of the clock signal may not be corrected every time but may be intermittently corrected, for example, once every several times. Even with such a configuration, it becomes possible to improve the accuracy of the internal time compared to a case where the frequency $f_{VCO}$ of the clock signal is not corrected at all.

In each of the above-described aspects, the standard radio wave is JJY and the frequency of the carrier wave of JJY is set to 40 kHz, but the invention is not limited thereto. Each of the above-described aspects can be applied even when the frequency of the carrier wave of JJY is 60 kHz, and even when the standard radio wave is WWVB, DCF77, MSF, BPC, or the like, the aspects can be applied.

In each of the above-described aspects, the frequency of the carrier wave of the standard radio wave is converted into the reference frequency f0, but the clock signal may be converted into the frequency of the carrier wave of the standard radio wave. However, since the exact frequency of the clock signal is unknown, the electronic timepiece 1 may multiply the frequency of the clock signal (frequency of the carrier wave of the standard radio wave/reference frequency f0) times by using the NCO, and may specify the frequency difference Δfv. Otherwise, in each of the above-described aspects, the carrier wave of the standard radio wave and the clock signal may be converted into frequencies different from the reference frequency f0 and the frequency of the carrier wave of the standard radio wave, respectively, and the frequency difference Δfv may be specified.

In each of the above-described aspects, the electronic timepiece 1 may determine whether the internal time is corrected by using the TCO signal or the internal time is corrected by using the frequency difference Δfv in accordance with the number of times of receiving the standard radio wave. For example, the electronic timepiece 1 may correct the internal time by using the TCO signal in a case where the remainder obtained by dividing the number of times of receiving the standard radio wave by a predetermined natural number is 1, and may correct the internal time by using the frequency difference Δfv in a case where the remainder is not 1. In addition, the electronic timepiece 1 may correct the internal time by using the frequency difference Δfv every predetermined period such as one week or one month, and may correct the internal time by using the TCO signal during the period. Furthermore, the processing unit 24 acquires the operation signal output when the user operates a button 4-1, a button 4-2, or a button 4-3, and the processing unit 24 may determine whether to correct the internal time by using the TCO signal based on the operation signal or to correct the internal time by using the frequency difference Δfv. Further, the processing unit 24 may periodically correct the internal time by using the TCO signal, and may correct the internal time by using the frequency difference Δfv when the processing unit 24 acquires the operation signal output when the user operates the button 4-1, the button 4-2, or the button 4-3.

In each of the above-described aspects, the electronic timepiece 1 may determine whether the internal time is corrected by using the TCO signal or the internal time is corrected by using the frequency difference Δfv in accordance with the time at which the standard radio wave is received and the number of times of receiving the standard radio wave. For example, the electronic timepiece 1 may correct the internal time by using the TCO signal in a case where the standard radio wave is received for the first time in a certain month, and may correct the internal time by using the frequency difference Δfv in a case of the second and subsequent times.

In each of the above-described aspects, the electronic timepiece 1 is not limited to the wristwatch illustrated in FIG. 1, and may be a clock or a wall clock. Furthermore, the display method of the electronic timepiece 1 is not limited to an analog type illustrated in FIG. 1, but may be a digital type. In a case where the display method of the electronic timepiece 1 is the digital type, the electronic timepiece 1 may display an image indicating that the correction is completed when the clock frequency is corrected.

In each of the above-described aspects, the electronic timepiece 1 can also be regarded as a computer program configured to cause the processor 22 to function or a computer readable recording medium in which the computer program is recorded. The recording medium is, for example, a non-transitory recording medium and may include any known recording medium, such as a semiconductor recording medium or a magnetic recording medium, in addition to an optical recording medium, such as a CD-ROM. Further, the invention is also specified as a control method of the electronic timepiece according to each of the above-described aspects.

In each of the above-described aspects, in processor 22, all or a part of the elements realized by executing the program may be realized by hardware by an electronic circuit, such as an FPGA or an ASIC, or may be realized by the cooperation of software and hardware. The processor 22 may be one electronic circuit or may be a plurality of electronic circuits. Although it is described that the internal time correction unit 242 is realized by executing the program by the processing unit 24, the internal time correction unit 242 may be included in the processor 22.

What is claimed is:

1. An electronic timepiece comprising:

a receiver configured to receive a standard radio wave on a carrier wave;

an oscillation circuit configured to generate a clock signal with a frequency and used for measuring an internal time; and a processor configured to specify phase differences between the clock signal and a reference wave with a reference frequency, the reference frequency based on a frequency of the carrier wave, and to control the oscillation circuit based on the phase differences such that the frequency of the clock signal is close to the reference frequency.

2. The electronic timepiece according to claim 1, wherein the processor is configured to specify a difference between the reference frequency and the frequency of the clock signal, and to control the oscillation circuit for correcting the frequency of the clock signal so as to be close to the reference frequency, based on the difference.

3. The electronic timepiece according to claim 2, wherein the processor is configured to specify the difference based on a first phase difference between the reference wave and the clock signal at a first time, a second phase difference between the reference wave and the clock signal at a second time, and a time period from the first time to the second time.

4. The electronic timepiece according to claim 3, wherein the processor is configured to output a control voltage based on the difference, and the frequency of the clock signal corresponds to the control voltage.

5. The electronic timepiece according to claim 2, wherein the processor is configured to output a control voltage based on the difference, and the frequency of the clock signal corresponds to the control voltage.

6. The electronic timepiece according to claim 2, wherein the frequency of the clock signal corresponds to a control voltage, and the oscillation circuit includes a storage that stores cumulative operation time characteristic information related to a cumulative operation time of the oscillation circuit and the frequency of the clock signal generated in a case where a predetermined voltage is input to the oscillation circuit, and the processor is configured to specify an error in the frequency of the clock signal that corresponds to the cumulative operation time of the oscillation circuit with reference to the cumulative operation time characteristic information, to generate the control voltage such that the error is canceled, to update the cumulative operation time characteristic information based on the difference and the cumulative operation time of the oscillation circuit at a point of time when the difference is specified, and to correct the frequency of the clock signal.

7. The electronic timepiece according to claim 2, wherein the frequency of the clock signal corresponds to a control voltage, and the oscillation circuit includes a storage that stores temperature characteristic information related to the frequency of the clock signal generated in a case where a temperature obtained by the oscillation circuit and a predetermined voltage are input to the oscillation circuit, and the processor is configured to specify an error in the frequency of the clock signal that corresponds to the temperature of the oscillation circuit with reference to the temperature characteristic information, to generate the control voltage such that the error is canceled, to update the temperature characteristic information based on the difference and the temperature of the oscillation circuit at a point of time when the difference is specified, and to correct the frequency of the clock signal.

8. The electronic timepiece according to claim 2, wherein:

the processor is configured to correct the internal time based on the difference and a number of clock signals from a time when the internal time is set based on the standard radio wave to the current time.

9. A control method of an electronic timepiece including a receiver configured to receive a standard radio wave on a carrier wave, and an oscillation circuit configured to generate a clock signal with a frequency used for measuring an internal time, the method comprising:

causing the electronic timepiece to specify phase differences between the clock signal and a reference wave with a reference frequency, the reference frequency based on a frequency of the carrier wave; and causing the electronic timepiece to control the oscillation circuit based on the phase differences such that the frequency of the clock signal is close to the reference frequency.

10. The control method of an electronic timepiece according to claim 9, further comprising:

specifying a difference between the reference frequency and the frequency of the clock signal, and controlling the oscillation circuit and correcting the frequency of the clock signal so as to be close to the reference frequency, based on the difference.

11. The control method of an electronic timepiece according to claim 10, wherein the difference is specified based on a first phase difference between the reference wave and the clock signal at a first time, a second phase difference between the reference wave and the clock signal at a second time, and a time period from the first time to the second time.

12. The control method of an electronic timepiece according to claim 11, further comprising:

outputting a control voltage based on the difference, and controlling the oscillation circuit such that the frequency of the clock signal corresponds to the control voltage.

13. The control method of an electronic timepiece according to claim 10, further comprising:

outputting a control voltage based on the difference, and controlling the oscillation circuit such that the frequency of the clock signal corresponds to the control voltage.

14. The control method of an electronic timepiece according to claim 10, further comprising:

controlling the oscillation circuit such that the frequency of the clock signal corresponds to a control voltage, storing cumulative operation time characteristic information related to a cumulative operation time of the oscillation circuit and the frequency of the clock signal generated in a case where a predetermined voltage is input to the oscillation circuit, and specifying an error in the frequency of the clock signal that corresponds to the cumulative operation time of the oscillation circuit with reference to the cumulative operation time characteristic information, generating the control voltage such that the error is canceled, updating the cumulative operation time characteristic information based on the difference and the cumulative operation time of the oscillation circuit at a point of time when the difference is specified, and correcting the frequency of the clock signal.

15. The control method of an electronic timepiece according to claim 10, further comprising:

controlling the oscillation circuit such that the frequency of the clock signal corresponds to a control voltage, storing temperature characteristic information related to the frequency of the clock signal generated in a case where a temperature obtained by the oscillation circuit and a predetermined voltage are input to the oscillation circuit, and specifying an error in the frequency of the clock signal that corresponds to the temperature of the oscillation circuit with reference to the temperature characteristic information, generating the control voltage such that the error is canceled, updating the temperature characteristic information based on the difference and the temperature of the oscillation circuit at a point of time when the difference is specified, and correcting the frequency of the clock signal.

16. The control method of an electronic timepiece according to claim 10, further comprising:

correcting the internal time based on the difference and a number of clock signals from a time when the internal time is set based on the standard radio wave to the current time.

17. An electronic timepiece comprising:

a receiver configured to receive a standard radio wave on a carrier wave;

an oscillation circuit configured to generate a clock signal with a frequency and for measuring an internal time; and a processor configured to specify phase differences between the clock signal and a reference wave with a reference frequency, the reference frequency based on a frequency of the carrier wave, and to control the oscillation circuit based on the phase differences to reduce a difference between the frequency of the clock signal and the reference frequency.

* * * * *